June 10, 1947.  F. O. V. HIERGESELL  2,421,942
GUARDED FIRE ALARM THERMOSTAT
Filed Sept. 16, 1944
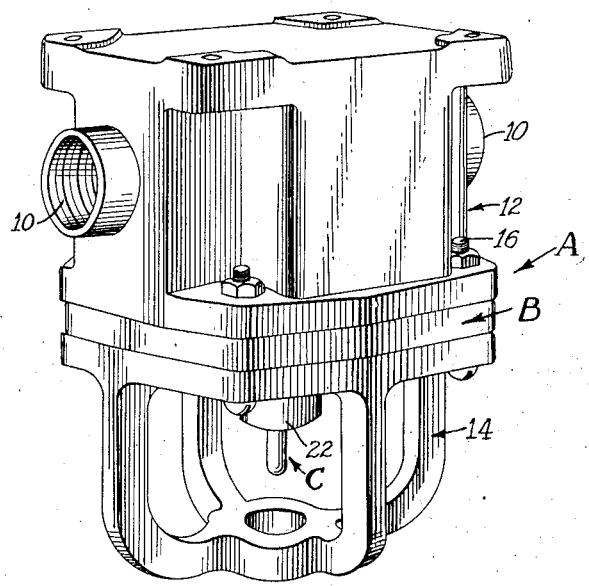
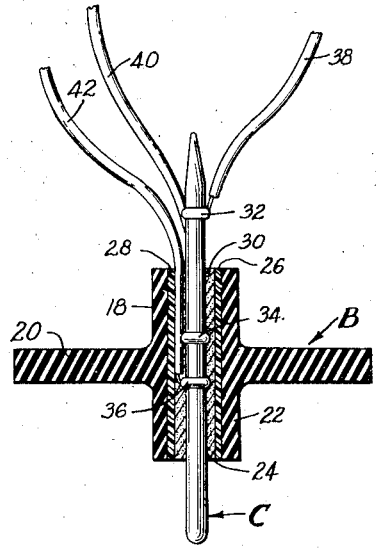
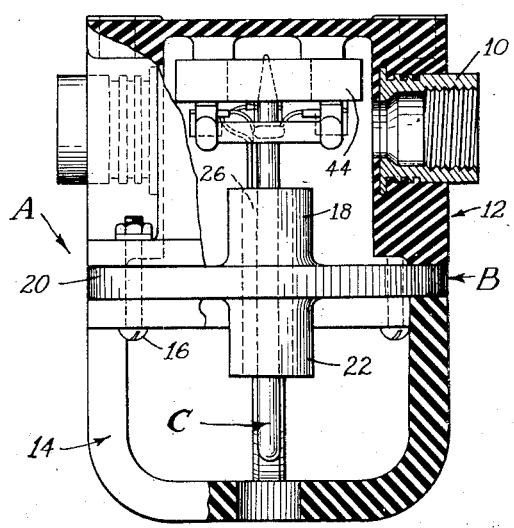
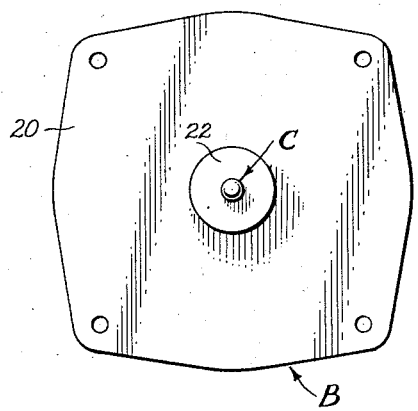
INVENTOR
FRANK O.V. HIERGESELL
BY
Harry Langsam
ATTORNEY Patented June 10, 1947

2,421,942

UNITED STATES PATENT OFFICE 2,421,942

GUARDED FIRE ALARM THERMOSTAT

Frank O. V. Hiergesell, Philadelphia, Pa.

Application September 16, 1944, Serial No. 554,515

5 Claims. (Cl. 200—141)

My invention relates to a thermostat control employed on ships for the purpose of detecting fires or some unusual rise in temperature in a room or hold of the ship.

Heretofore, thermostat control units have been employed in the holds or rooms of a ship in order to indicate a fire if it should occur in the vicinity of the unit.

The purpose of using the thermostat aforementioned is that in the event the ship is struck by a torpedo or a bomb and part of the ship is set on fire, the thermostat indicates the abnormal rise in temperature since it is important to know where the fire occurs. By virtue of an electrical control system, the rise in temperature at the location of the thermostat is indicated at some central point aboard the ship. Heretofore, when a ship was struck by a bomb or torpedo, the terrific impact to the thermostat would break it and, of course, at a critical moment the device would be rendered inoperative.

At the present time, mercury thermostats have been supported in a two piece "bakelite" casing. A flexible support, which separates the two "bakelite" casing pieces, also supports the mercury thermostat. The prior art mercury thermostat was enclosed by an externally threaded longitudinally split molded bushing which pierced the flexible support, and the molded bushing was held to the flexible support by virtue of a lock nut engaging the bushing adjacent each side of the support. This prior art construction resulted in the breaking of the thermostat when the entire unit was subjected to terrific shock, of the order of 2,000 foot pounds, the minimum impact required for use of the thermostat aboard ship.

It is the purpose of the present invention to provide a mercurial thermostat which can withstand a severe shock test of 2,000 foot pounds and which will be relatively inexpensive to manufacture as compared to the prior art device.

Another object of my invention is to provide a guarded fire alarm thermostat unit which will be operable at all times, under any and all conditions and at any desired temperature.

Another object of my invention is to provide a mercury thermostat supporting unit which is relatively inexpensive to manufacture.

Other objects of my invention are to provide an improved device of the character described, that is easily and economically produced, which is sturdy in construction, and which is highly efficient in operation.

With the above and related objects in view, my invention consists in the details of construction and combination of parts as will be more fully understood from the following description, when read in conjunction with the accompanying drawing, in which:

Fig. 1 is a perspective view of the outside of a combined housing and mercury thermostat unit embodying my invention.

Fig. 2 is a fragmentary sectional view showing the interior of the mercury thermostat housing embodying my invention.

Fig. 3 is a fragmentary sectional view showing the flexible support for the mercurial thermostat.

Fig. 4 is a bottom view of the mercurial thermostat and its accompanying supporting cover, illustrated in Fig. 3.

Referring now in detail to the drawing, wherein similar reference characters designate corresponding parts throughout, I show a Bakelite housing, generally designated as A, wherein brass coupling fittings 10 therein are adapted to be joined to conduits for electrical wires. The Bakelite housing A is divided into two parts, a housing 12 and a guard 14, separated by a flexible rubber or neoprene thermostat support, generally designated as B. The housing 12 supports the conduits which carry electrical wires that enter the bushings 10 as well as the electrical wires which lead to the various terminals on a mercury thermostat, generally designated as C; and the guard 14 serves to guard the mercury thermostat C from being hit by any passing article.

The flexible rubber or neoprene support B, which separates the housing portions 12 and 14, also carries and supports the mercury thermostat C. The edges of the highly flexible rubber support B are securely held between the two parts 12, 14 of the housing A by virtue of the holding bolts 16, and since the mercury thermostat is carried in the center of the support, any shock or vibration imparted to the casing A can only be transmitted to the mercury thermostat C through the flexible support B.

The flexible mercury thermostat support B is substantially flat at its periphery and it has integrally molded or formed therewith a hollow cylindrical portion at its center which extends above and below the flat portion 20 of the support B. The upper integrally molded or formed hollow cylindrical portion 18 projects above the flat portion 20 of the support B and lower cylindrical portion 22 extends beneath the flat portion 20. The cylindrical members 18, 22 are aligned and have common bores 24 and 28 aligned through the central flat portion 20.

Within the bores of the cylindrical portions 18 and 22 is a hard, phenolic condensation tube 26 whose outer surface is in tight engagement with bore 28 of the upper cylinder 18 as well as the lower cylindrical portion 22 and a binding cement 30 is between the thermostat C and the inner surface of the tube 26. Hence, the mercury thermostat C is cemented at 30 to a hard fibre tube 26, which tube is firmly held by the flexible support B and its cylindrical portions 18 and 22, hence, the thermostat C is held in a firm, but not rigid, grip on the flexible support B. The bulb of the thermostat C is exposed to the atmosphere beneath cylindrical portion 22, although it is guarded against breakage by housing 14.

A series of electrical rings or terminals 32, 34 and 36 are connected to points within the bore of the thermostat so that the rise of mercury in the thermostat may contact the electrical points to close an electrical circuit. Suitable electrical leads 38, 40 and 42 are properly connected to the terminals 32, 34 and 36, respectively. The electrical leads 38, 40 and 42 are properly connected to the terminal block 44 within the upper housing portion 12.

The mercury thermostat unit above described has adequately withstood the essential shock tests which devices of its character must withstand.

This invention may be applied to incubators, or any other compartments, buildings, housing, room, grain elevator, or casing subject to fire or excessive heat, or in places where spontaneous combustion may occur.

Although my invention has been described in considerable detail, such description is intended as illustrative rather than limiting, since the invention may be variously embodied, and the scope of the invention is to be determined as claimed.

I claim as my invention:

1. A mercury thermostat unit, comprising a housing divided into two parts, a mercury thermostat, a flexible support for said thermostat positioned between the two parts of said housing, said flexible support supporting said thermostat.

2. A mercury thermostat unit, comprising a two-part housing, a mercury thermostat having electrical connections thereon, a flexible support for holding said thermostat a lower cylindrical integrally formed thermostat gripping member on said support, a bulb portion of the thermostat protruding through the integrally formed flexible rubber cylindrically formed gripping member, and one part of said housing forming a guard.

3. A mercury thermostat unit, comprising a two-part housing, a mercury thermostat having spaced electrical connections thereon, a flexible support for holding said mercury thermostat, a hard cylindrical tube surrounding said thermostat, a holding material between said tube and said thermostat, a cylindrical member integrally formed with said support, and said hard tube gripped by said cylindrical member whereby the bulb of the thermostat extends beneath said support.

4. A mercury thermostat unit, comprising a two-part housing, a mercury thermostat having spaced electrical connections thereon, a flexible support for holding said mercury thermostat, a hard cylindrical tube surrounding said thermostat, a holding material between said tube and said thermostat, a cylindrical member integrally formed with said support, and said hard tube gripped by said cylindrical member whereby the bulb of the thermostat extends beneath said support.

5. A mercury thermostat unit, comprising a two-part housing, a mercury thermostat having spaced electrical connections thereon, a flexible support for holding said mercury thermostat, a hard cylindrical tube surrounding said thermostat, a water tight holding material between said tube and said thermostat, a cylindrical member integrally formed with said support, said hard tube gripped by said cylindrical member whereby the bulb of the thermostat extends beneath said support, another cylindrical member extending beneath said support and integrally formed therewith, said another cylindrical member gripping said hard tube, one part of said housing being adapted to support said flexible support and enclosing most of the thermostat, and the second part of said housing guarding the exposed bulb of said thermostat.

FRANK O. V. HIERGESELL.

REFERENCES CITED

The following references are of record in the file of this patent:

UNITED STATES PATENTS

| Number | Name | Date |
| --- | --- | --- |
| 2,046,578 | Parks et al. | July 7, 1936 |
| 1,090,776 | Boyce | Mar. 17, 1914 |